United States Patent [19]
Mithal et al.

[11] Patent Number: 5,953,720
[45] Date of Patent: Sep. 14, 1999

[54] METHOD AND APPARATUS FOR A UNIFIED CHOOSER FOR HETEROGENEOUS ENTITIES

[75] Inventors: Anant Kartik Mithal, Sunnyvale; David M. Bristor, Menlo Park; Lynn Monsanto, San Francisco, all of Calif.

[73] Assignee: Sun Microsystems, Inc., Palo Alto, Calif.

[21] Appl. No.: 08/912,148

[22] Filed: Aug. 15, 1997

[51] Int. Cl.⁶ .................................................... G06F 17/00
[52] U.S. Cl. ..................................... 707/10; 707/1; 707/2
[58] Field of Search ..................... 707/10, 1, 2; 345/355; 395/701, 677

[56] References Cited

U.S. PATENT DOCUMENTS

| 5,345,586 | 9/1994 | Hamala et al. | 707/10 |
| 5,421,015 | 5/1995 | Khoyi et al. | 395/677 |
| 5,560,005 | 9/1996 | Hoover et al. | 707/10 |
| 5,680,619 | 10/1997 | Gudmundson et al. | 395/701 |
| 5,752,022 | 5/1998 | Chiu et al. | 707/10 |
| 5,752,246 | 5/1998 | Roger et al. | 707/10 |
| 5,761,663 | 6/1998 | Lagarde et al. | 707/10 |
| 5,781,189 | 7/1998 | Holleran et al. | 345/355 |

OTHER PUBLICATIONS

Alan Simpsons, "Windows 95", IDG Brooks Worldwide, Inc. pp. 48–49, 57, and 69, 1995.

Berners–Lee, T. et al. (eds.): Uniform Resource Locators (URL), cited in a Memorandum. 1–25 (1994).

Raggett, D., "HyperText Markup Language (HTML) 3.2," in HTML 3.2 Reference Specification W3C Reccommendation. 1–50 (1997).

*Primary Examiner*—Wayne Amsbury
*Assistant Examiner*—Thuy N. Pardo
*Attorney, Agent, or Firm*—Dehlinger & Assoc.; David P. Lentini

[57] ABSTRACT

Apparatus, methods, and computer program products that disclose an entity chooser (similar to a file chooser) that uniformly presents heterogeneous entities accessed through different access methods. The invention allows a computer user to select, using a single interface, an entity from a collection of entities representing accessible information. For example, the invention can simultaneously and uniformly present entities located on a filesystem along with entities found on a network to the user for selection.

24 Claims, 6 Drawing Sheets

METHOD AND APPARATUS FOR A UNIFIED CHOOSER FOR HETEROGENEOUS ENTITIES

BACKGROUND OF THE INVENTION

1. Field of the Invention

This invention relates to the field of graphical user interfaces for human-computer interactions. Specifically, this invention is a method, apparatus and computer program product for providing a unified chooser interface to a heterogeneous collection of entities accessible through different access methods from a computer.

2. Background

Modern graphical user interfaces (GUI) allow computer users to choose one or more entities from a set of possible entities. Generally the GUI presents the user with a listing of entities within a "chooser dialog". The user chooses one or more of the listed entities by using a pointing device. This approach has been used in the prior art to allow a user to choose between files, or between printers, or between communication options or between other homogeneous entities. One example of a common use of a chooser is to present a list of files in an "open-file" dialog. These "open-file" choosers generally distinguish between normal files and directory files. Directory files have information about other files that are contained in the directory. A directory file is an example of a container entity. A user can expand (drill-into) a directory to view the files it contains. Thus, the user can examine or navigate through the file system by using the chooser's expansion capabilities. A user can also select one of the displayed files for processing by the application that invoked the dialog. Another prior art approach is to use a tree structure to present the files and directories contained within the filesystem. This approach provides the user with a graphical representation of the location of a file in the filesystem. Command line interfaces can also provide the capability to list directory contents and to drill-into subdirectories.

Prior art file choosers use the computer's filesystem to access files. The chooser is unable to access entities (such as files) that are not accessible through the computer's filesystem. For example, prior art file choosers do not access files through the world wide web (WWW).

The WWW is a hypertext system that a computer user navigates through by using a WWW browser application. The WWW browser application communicates with WWW server computer applications to obtain information and services in the form of web pages. These web pages are identified by unique uniform resource locators (URL). The information provided to the user of a WWW browser application often includes references to other related information. These references are hyperlinks. Hyperlinks often include a URL used to access the reference. Activating these hyperlinks often results in accessing completely different web pages (supplied from completely different WWW server applications on other computer systems) from the web page that contains the hyperlink. A user often navigates through many hyperlinks to reach the user's desired information or service.

A user of a WWW browser activates a hyperlink to display the contents of the web page referenced by the URL associated with the hyperlink. The browser formats the information contained in the referenced web page according to a page markup language such as HTML. HTML allows URLs to be embedded within tags. These tags are distributed throughout the HTML data as appropriate for the presentation of the information defined by the HTML data. One skilled in the art will understand that a browser's presentation of HTML data does not provide a simple way to choose a URL contained in the HTML data because the URL is not accessible from within the formatted web page. Instead, the text or graphic associated with the URL, by the tag, is displayed. Further, one skilled in the art will understand that the URLs contained in a web page are not presented to the user in any sorted order. This is because the URLs are embedded within the web page dependent on the page layout desired by the web page designer. Thus, it would be advantageous to provide a chooser mechanism to the user for selecting a URL from the HTML that defines a web page. In addition it would be advantageous to allow the user to drill-into container entities, such as HTML data, that contain URLs. This capability would enable the user to navigate the WWW through the URLs instead of displayed web pages. This capability also provides the user with the ability to choose resources or entities defined by URLs in the same manner as the user chooses a file.

Microsoft's Internet Explorer® (version 4.0) browser application allows the user to examine information accessible from the local computer's desktop (such as files and devices) and presents formatted HTML data accessed from the internet. However, this browser does not uniformly display the obtained information. Instead, the Internet Explorer browser displays information obtained from accessing the computer's desktop differently from the information obtained from accessing the internet. In particular, although the contents of the desktop are displayed in a hierarchical manner, the Internet Explorer browser only provides a simple list of the titles of web pages that have been accessed by the browser. (The displayed title is obtained from a tag within the HTML data.) Thus, accessible entities contained in the HTML data are not presented to the user unless the HTML data is formatted and displayed to the user. Although the titles of web pages accessed by the user are presented, the URLs of web pages that were not followed, nor the URLs of other data files (such as HTML referenced image files) are not displayed to the user. Thus, the Internet Explorer browser does not treat internet accessible entities as container entities even though the web page data contains URLs to other entities. Therefor, the Internet Explorer browser does not uniformly present entities to the user because it presents container entities from the desktop differently from container entities from the internet.

The background of the World Wide Web (WWW) and WWW browsers are well understood in the art. The URL specification is described in RFC-1738 that can be found on the WWW at:

"http://www.cis.ohio-state.edu/htbin/rfc/rfc1738.html"

One version of the HTML specification is described in "REC-htm132.html" that can be found on the WWW at:

"http://www.w3.org/TR/REC-html32.html"

The prior art does not uniformly present, for selection or expansion, entities that reside in the computer's desktop, filesystem or a class library; or entities on the internet; or entities defined by a markup language tag, those that represent operating system accessible information, or other entities that have an internal structure. It would be advantageous to provide a chooser that uniformly presents entities for selection to the user. Further, it would be advantageous to determine whether the entity contains other entities and to allow the user to expand such container entities to expose contained entities. In the case of HTML files, it would be advantageous to display to the user and allow the user to navigate through URLs without presenting or formatting the data defining the web page. Finally, the prior art does not operate as a chooser that enables a user to select an entity for processing by an application.

SUMMARY OF THE INVENTION

The present invention discloses a unified approach to presenting, expanding and selecting entities accessible to the computer through different access mechanisms.

The present invention provides an apparatus, method and computer program product for uniformly presenting a heterogeneous collection of entities to a user. One aspect of the invention is a method that includes the step of locating a first entity through a first access mechanism and a second entity through a second access mechanism. The first access mechanism is a different access mechanism than the second access mechanism. The first entity has a first identification and the second entity has a second identification. Both the first entity and the second entity belong to the heterogeneous collection of entities. The method also includes the step of determining a first container characteristic for the first entity. Next, the invention presents the first identification, the second identification and the first container characteristic to represent the heterogeneous collection of entities.

Another aspect of the invention is an apparatus, having a central processing unit (CPU) and a memory coupled to the CPU, for uniformly presenting a heterogeneous collection of entities to a user. The apparatus includes an entity location mechanism configured to locate a first entity. The first entity has a first identification. The first entity is located through a first access mechanism. The entity location mechanism is also configured to locate a second entity, having a second identification, through a second access mechanism. The first access mechanism is different from the second access mechanism. Both the first entity and the second entity belong to the heterogeneous collection of entities. The apparatus also comprises a determination mechanism configured to determine a first container characteristic for the first entity located by the entity location mechanism. In addition, the apparatus includes a presentation mechanism configured to present the heterogeneous collection of entities representing the first identification, the second identification, and the first container characteristic.

Yet a further aspect of the invention is a computer program product embedded on a computer usable medium for causing a computer to uniformly present a heterogeneous collection of entities to a user. When executed on a computer, the computer readable code causes a computer to effect an entity location mechanism, a determination mechanism and a presentation mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

The following 'notations and nomenclature' are provided to assist in the understanding of the present invention and the preferred embodiments thereof.

Access Mechanism—The invention obtains information about entities by using an entity specific access mechanism to obtain this information. For example, the invention uses the file system to obtain information about a file. Another access mechanism opens an HTML document and extracts URLs that are embedded within HTML tags. Yet another access mechanism utilizes system status calls to obtain information about system entities such as memory usage and system performance characteristics. Information about each of these entities can be uniformly presented using the invention even though the access mechanism used to obtain the information is different.

Browser—A browser is a computer application that allows a user to read hypertext. A browser application allows a user to view the contents of web pages (or nodes) and of navigating from one web page to another.

Chooser—A chooser is a dialog invoked by an application that presents a list of entities to the user and provides the user with the capability of selecting at least one of the entities as an input to the application.

Container characteristic—A container characteristic is determined by the entity's access mechanism parsing the contents of the entity or by some other similar operation on the contents of the entity, or the entity having a container state such as a directory file.

Dialog—A dialog is a specialized window in a GUI that presents the user with a number of selectable control areas and/or information display areas that allow the user to input information to the application that invoked the dialog.

Entity—An entity is the name of (a reference to) information. This information may or may not exist when the name is displayed. Attempting to access an entity's information when the information does not currently exist may cause the information to be created.

Expansion—An expanded entity is a container entity whose contents are presented to the user. Expanding an entity is the process of presenting the entity(s) contained in (or referenced by) a container entity. Expanding entities allows the user to navigate through the entity space. Compare with selection below.

Graphical User Interface (GUI)—A user interface that allows a user to interact with a computer display by pointing at selectable control areas on the display and activating a command or computer operation associated with the selectable control area. GUIs are well known in the art.

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. Pointing devices are generally used with graphical user interfaces. The pointing device can be implemented using keyboard commands such as the tab and arrow keys among others.

Selectable control area (SCA)—An area on a computer display that is sensitive to activation of a pointing device. A command or computer operation associated with the selectable control area is invoked on activation of the pointing device over the selectable control area. Most computer systems that provide a GUI also provide other methods for invoking these commands or computer operations such as keyboard function keys or command lines.

Selection—A selected entity is one that has been presented to the user by the invention and that has been chosen by the user. The selected entity is then passed to the program that invoked the dialog. Selection is not the same as expanding an entity—see expansion.

Web Page—A web page is generally a subset of Internet resources. As used in this application, a web page is a network data object or service that can be identified by a Uniform Resource Locator (URL).

Window—A window is an area, usually rectangular, on a computer display screen controlled by an application.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing computer instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Figure 1:
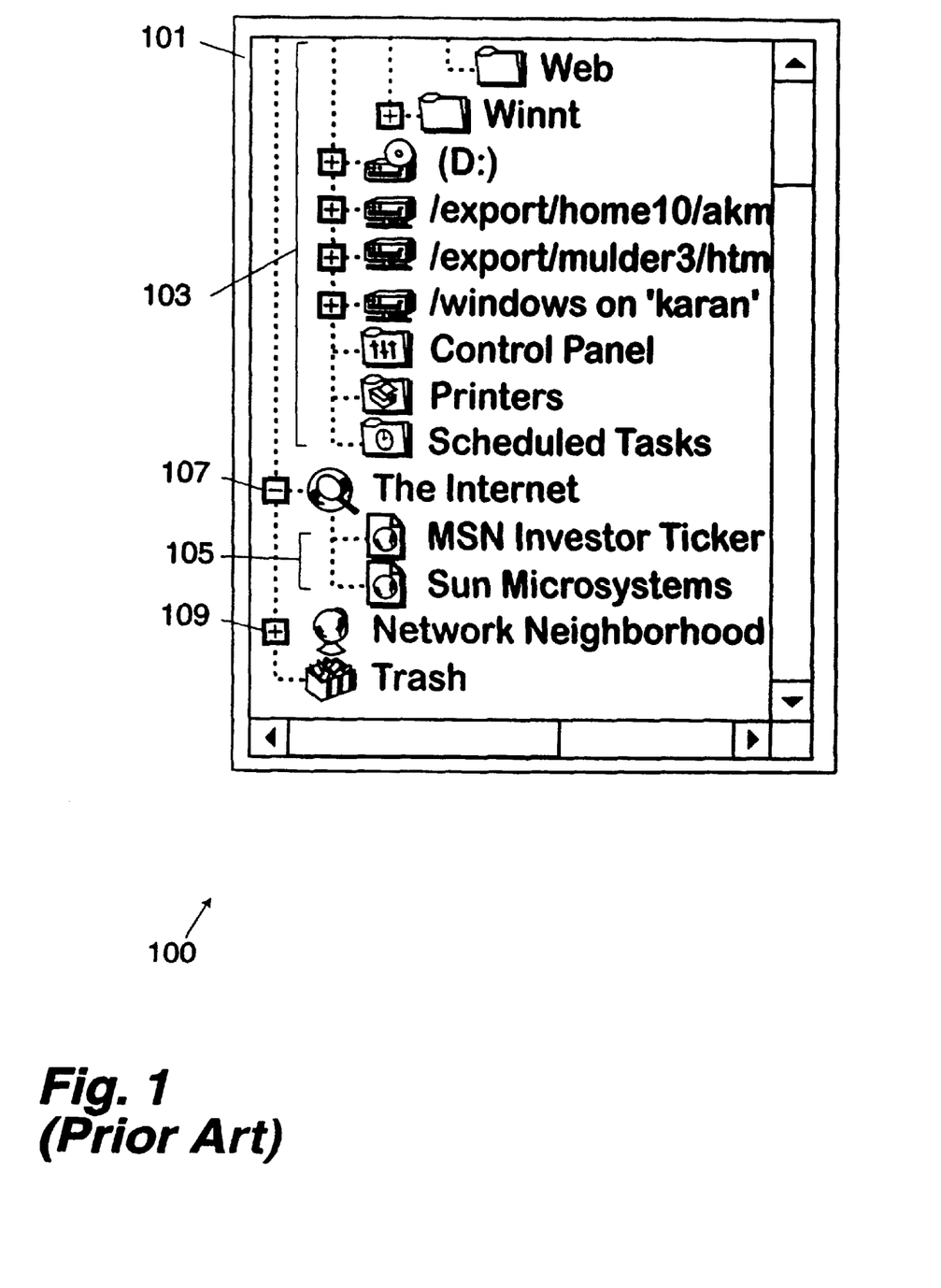
FIG. 1 illustrates a prior art browser illustrating a non-uniform display of computer resources and web pages.

FIG. 1 illustrates a prior art display 100 within a frame 101 that contains a display representing the computer's locally available resources and listing the titles of visited web pages. The computer's locally available resources are represented by a 'computer desktop' tree 103. The visited web pages are listed in a 'web page title' list 105. Some of these displayed entities are container entities that are associated with a 'container reducible icon' SCA 107 that provides the user with the capability of collapsing the entities contained within the container entity so that they are not visible. A reduced container entity can be expanded by the user's activation of a 'container expandable icon' SCA 109.

The above described prior art illustrates that entities displayed in the 'computer desktop' tree 103 are treated in a non-uniform manner as compared to the entities displayed in the 'web page title' list 105. In particular, the displayed web page titles do not indicate any container relationship and they do not provide information as to the URL used to reference the web page. The invention disclosed below provides these capabilities among others that will be clear to one skilled in the art.

Operating Environment

Figure 2:
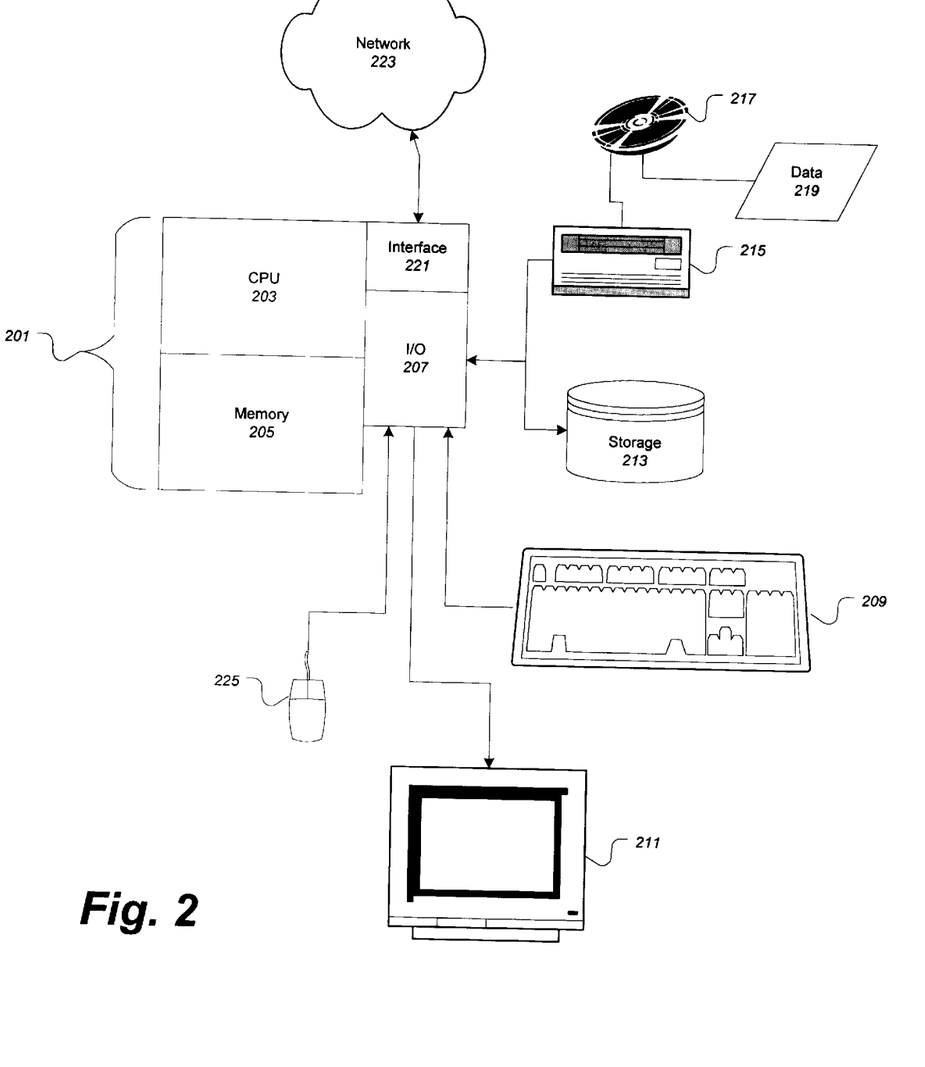
FIG. 2 illustrates a computer system capable of using the invention in accordance with a preferred embodiment.

Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The computer 200 also includes a network interface 221 that connects the computer 200 to a network 223. The computer also includes a pointing device 225. The CD-ROM drive unit 215, along with the CD-ROM medium 217, and the disk storage unit 213 comprise a file storage mechanism. Such a computer system is capable of executing programs that embody the invention.

Figure 3:
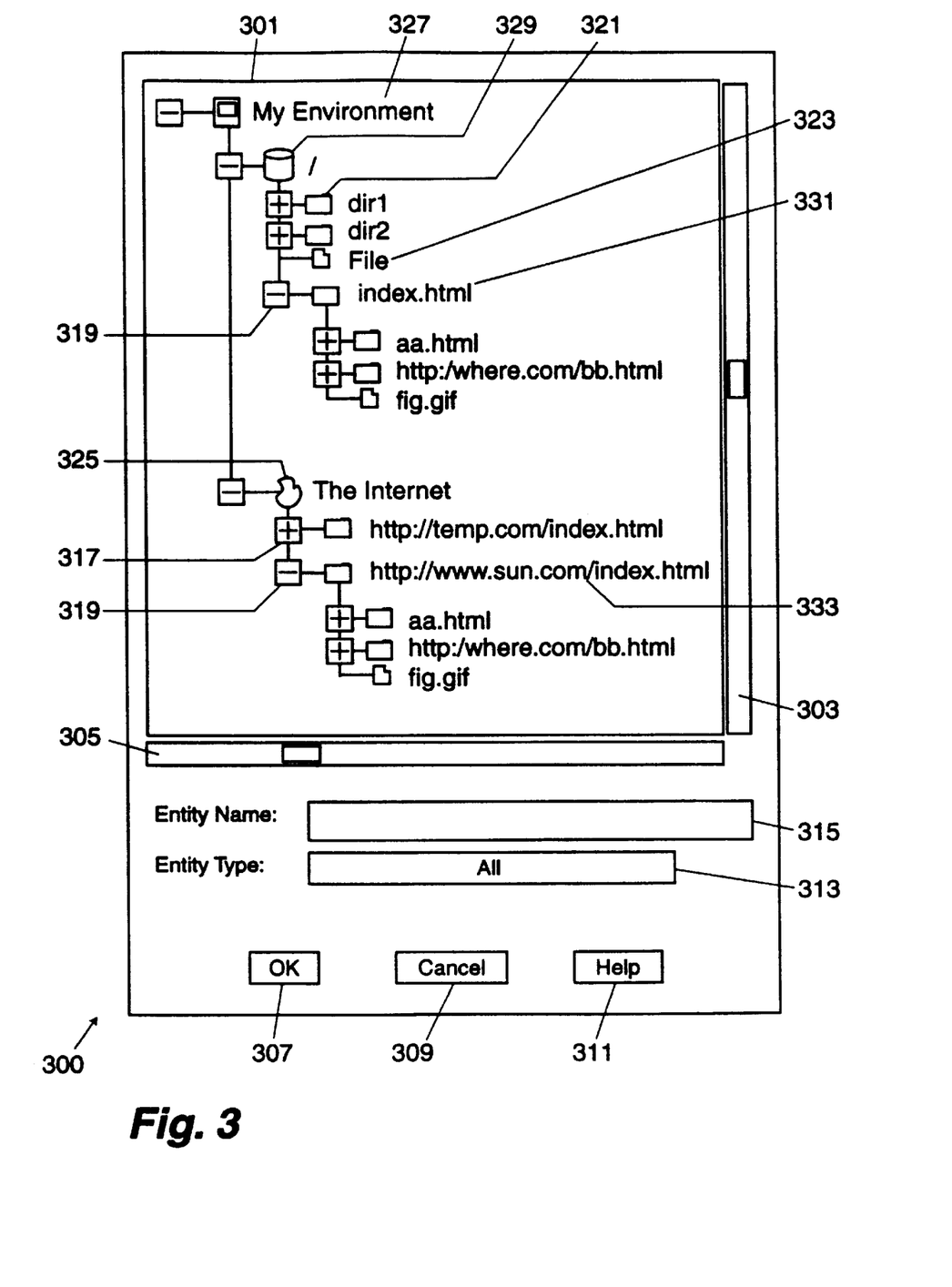
FIG. 3 illustrates a dialog presented in accordance with a preferred embodiment.

The invention presents a dialog to the user that enables the user to select an entity. The user can also "drill-into" (expand) a container entity to expose the entities contained in (or referenced by) the container entity. FIG. 3 illustrates a dialog 300 that includes a presentation area 301 used to uniformly present information about a heterogeneous collection of entities. The dialog 300 also includes a 'vertical scroll' SCA 303 and a 'horizontal scroll' SCA 305 the operation of each well understood by one skilled in the art. In addition, the dialog 300 also includes a 'confirmation' SCA 307, a 'cancel' SCA 309, and a 'help' SCA 311. The operations related to these SCAs 307, 309, 311 are also well understood by those skilled in the art.

A 'select filter' SCA 313 is used to present a selection of filters to the user. Each filter determines a subset of entities from the heterogeneous collection of entities that are presented in the presentation area 301. For example, the user can select a filter that only selects entities of a particular type (such as images).

The dialog 300 also includes a 'text entry' field 315 that allows the user to specify an entity to be added to the heterogeneous collection of entities. The user inputs the identifier of the entity in the 'text entry' field 315 and then invokes an update command operation as is described with respect to FIG. 5.

The presentation area 301 contains a uniform graphical representation of the relationship between the entities. Each presented container entity includes an 'expandable container' icon 317 or a 'reducible container' icon 319. The 'expandable container' icon 317 indicates that the container entity can be expanded to show the entities contained within (or referenced by) the container entity. The 'reducible container' icon 319 indicates that the container entity is expanded and can be reduced to only display the container entity and not the contained entities. In a preferred embodiment, the user expands a reduced container entity by using a pointing device to activate the SCA associated with the 'expandable container' icon 317 for the container entity. The user reduces an expanded container entity by using the pointing device to activate SCA associated with the 'reducible container' icon 319 for the container entity.

In addition, each presented entity is associated with an icon that indicates the entity's type. For example, a 'container entity' icon 321 is associated with a directory file named "dir1"; a 'non-container entity' icon 323 is associated with a data file named "File"; an 'internet access' icon 325 indicates that the "The Internet" is a container entity referencing entities that are accessed through the internet; a 'system access' icon 327 indicates that "My Environment" is a container entity; and a 'disk access' icon 329 indicates that "/" is a container entity accessed through a filesystem. One skilled in the art will understand that different icons can be used to classify other types of displayed entities.

One skilled in the art will also understand that container entities can be accessed through multiple access methods. In particular, a first container 331 accessed through the filesystem can be the same container that is accessed through the internet (such as a second container 333—assuming, in this example, that the computer presenting the dialog 300 has an internet address of "www.sun.com" and further that its web server's document root is "/" as is understood by those skilled in the art).

Figure 4:
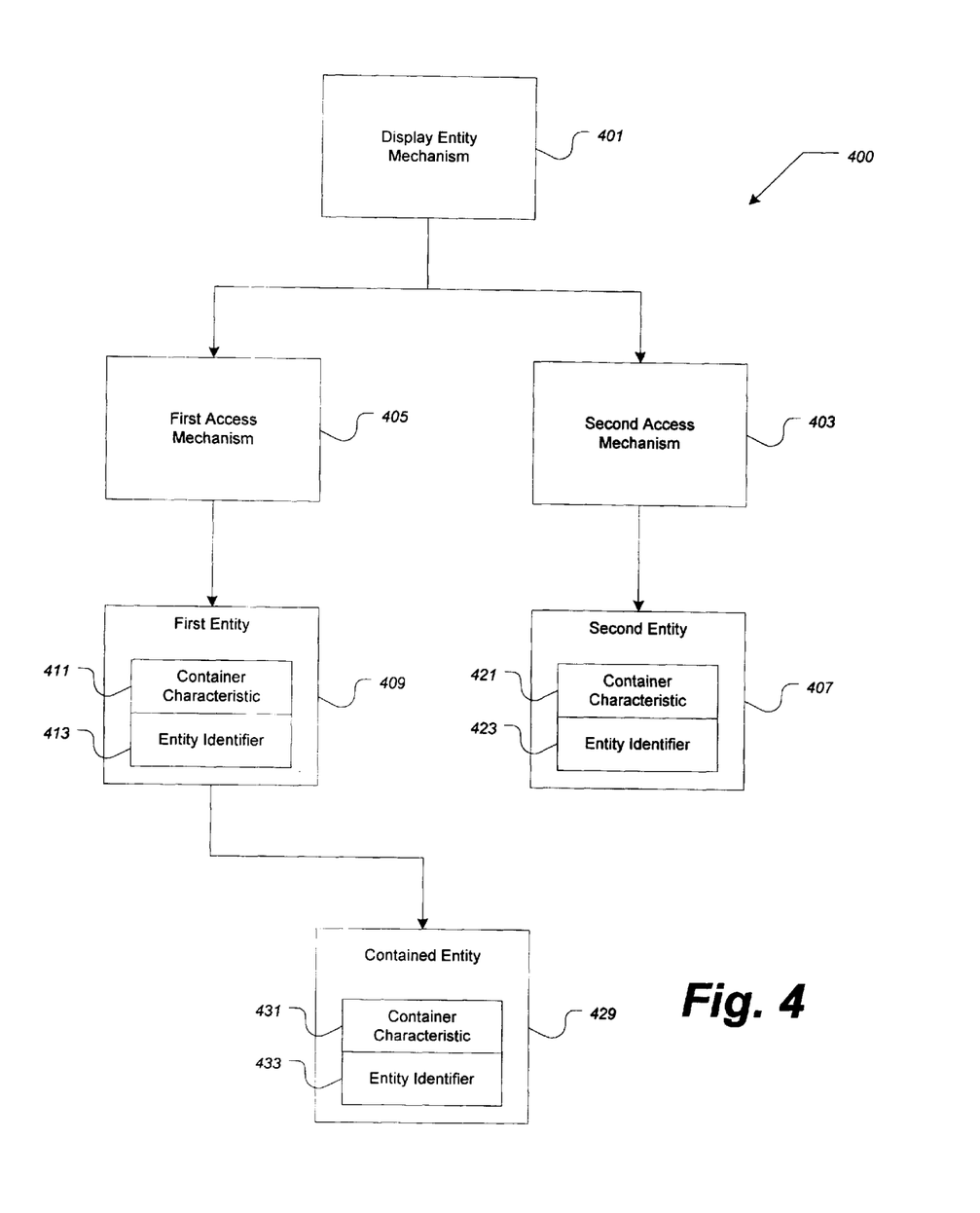
FIG. 4 illustrates a presentation architecture in accordance with a preferred embodiment.

The invention presents a heterogeneous collection of entities to the user by uniformly displaying entities that are accessed through different access mechanisms. FIG. 4 illustrates a 'unified resource presentation architecture' 400. One skilled in the art will understand that the 'unified resource presentation architecture' 400 can be implemented using object-oriented programming methodology as well as structured and procedural programming methodologies. A display mechanism 401 provides a uniform presentation of a heterogeneous collection of entities to a computer user. As will be subsequently described, the display mechanism 401 displays the entity's identifier and an icon that represents the entity's type. The display mechanism 401 can access entities through different access mechanisms. For example, one entity may be a file accessed by the local computer's filesystem access mechanism while another entity is a resource accessed using the internet access mechanism through a URL or even an operating system performance parameter. The invention uniformly displays information about accessible entities regardless of how the entities are accessed or the type of the entity. This information includes, without limitation, a URL, a filename, a hyperlink, a system resource, a markup language tag, or a class identifier in an object-oriented programming environment. The above information is extracted from an existing entity having an internal structure referencing or containing another entity.

The 'unified resource presentation architecture' 400 uses access mechanisms to obtain the information displayed about the entity. Some entities are accessed through a second access mechanism 403 while others are accessed through a first access mechanism 405. Each of these access mechanisms 403,405 provide information about the accessed entities. The first access mechanism 405 returns information about a first entity 409. This returned information includes a container characteristic 411 and an entity identifier 413.

The container characteristic 411 indicates whether the first entity 409 contains additional entities. In some cases the container characteristic is determined by the access mechanism processing the entity (such a parsing an HTML file to determine whether the file contains a URL). In other cases the access mechanism determines whether the entity contains an explicit container aspect (such as the directory field of a file used as a directory). The entity identifier 413 identifies the first entity 409 and generally is a string. In a similar manner the second entity 407 contains a container characteristic 421 and an entity identifier 423.

The first entity 409 is a container entity that contains a contained entity 429. The contained entity 429 also includes a container characteristic 431 and an entity identifier 433. Those skilled in the art will understand that the contained entity 429 may be accessed through a different access mechanism than the container entity such as the first entity 409. Further that the access mechanism may be determined from either or both of the contexts within which the entity exists, or by the reference to the contained entity. One example of this is a relative URL as compared to absolute URL.

Figure 5:
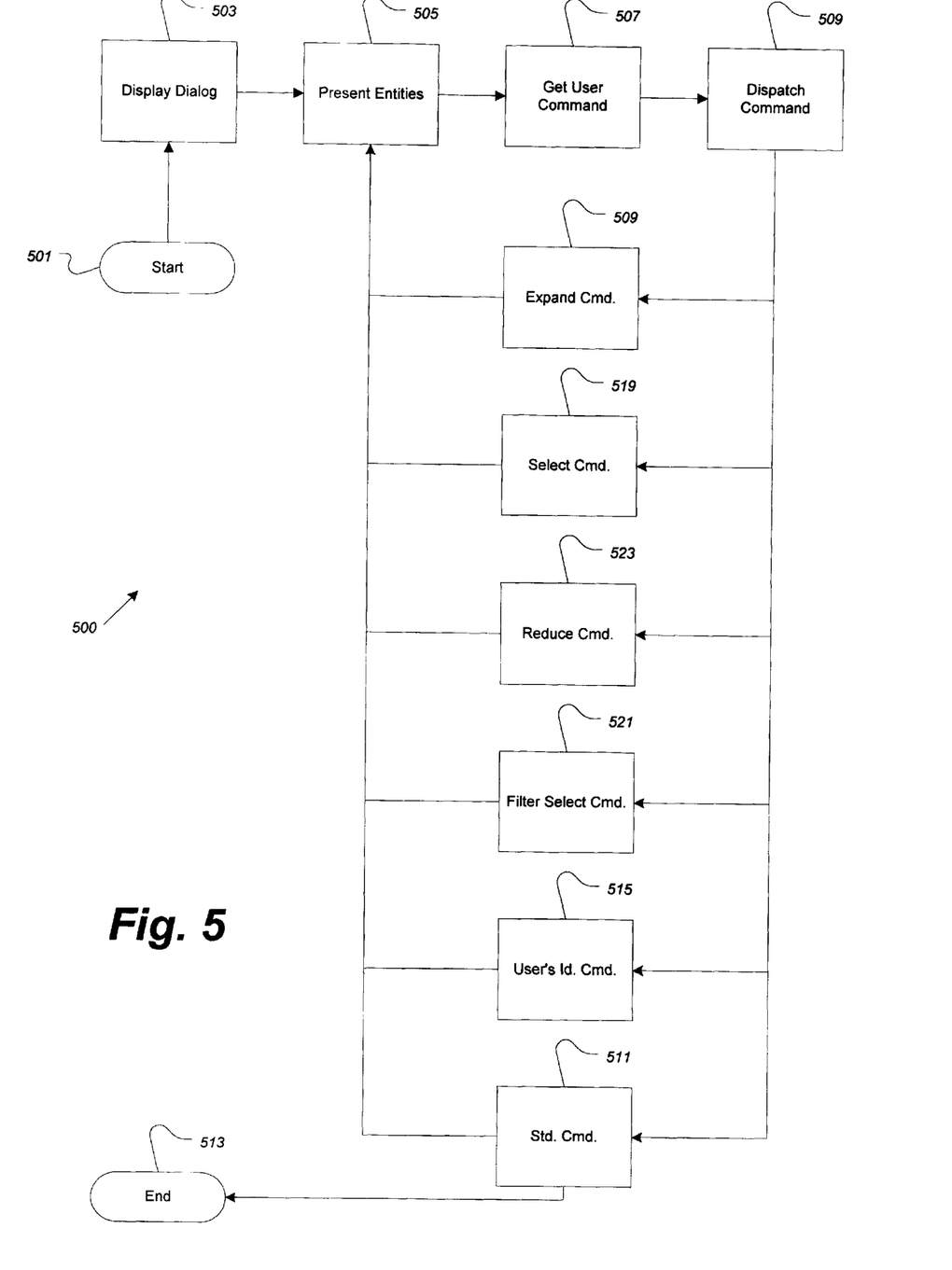
FIG. 5 illustrates a dialog command handling process in accordance with a preferred embodiment.

FIG. 5 illustrates a 'dialog command handling' process 500 that initiates at a 'start' terminal 501 and continues to a 'display dialog' procedure 503. The 'dialog command handling' process 500 is invoked by the user operating the pointing device on the dialog 300 illustrated in FIG. 3. The 'display dialog' procedure 503 presents the initial dialog to the user. Next, a 'present entities' procedure 505 presents the entities from the heterogeneous collection of entities. Initially this heterogeneous collection of entities includes default entities. The heterogeneous collection of entities can be expanded by the user expanding container entities. The 'present entities' procedure 505 is further described with regards to FIG. 6.

Once the filtered and sorted heterogeneous collection of entities is displayed, the 'dialog command handling' process 500 continues to a 'get user command' procedure 507 that obtains the user's command as determined by the user's interaction with the dialog. Next, a 'dispatch command' procedure 509 dispatches the command to be processed. A 'process standard command' procedure 511 processes well-known dialog commands including the cancel command. If the user's command was to cancel the dialog, the 'dialog command handling' process 500 completes through an 'end' terminal 513. Otherwise, the 'dialog command handling' process 500 returns to the 'present entities' procedure 505 to repeat the entity presentation process and the processing of user commands. The 'dispatch command' procedure 509 can also dispatch user commands to a 'user specified identification' procedure 515, a 'select filter' procedure 517, an 'expand command' procedure 519, a 'reduce command' procedure 521, and a 'select command' procedure 523.

The 'user specified identification' procedure 515 retrieves a user specified entity identification from the 'text entry' field 315 of the dialog 300 and adds this entity to the heterogeneous collection of entities. The 'user specified identification' procedure 515 is invoked when the user finishes entering text into the 'text entry' field 315 field, or when the user activates an update SCA (if supplied), after entering an entity's identification. If the entity is accessed using an existing access method, the entity's placement in the heterogeneous collection of entities is with the other entities using that access method. If the entity is accessed using a different access method, the entity's identification is inserted into the displayed list dependent on the access method. Thus, if the dialog currently displays only entities accessed through the filesystem, and the user specifies a non-filesystem accessed entity in the 'text entry' field 315 field, the 'user specified identification' procedure 515 adds an access-related container entity to the display. The access-related container entity corresponds to the 'internet access' icon 325 and the 'system access' icon 327 of FIG. 3.

The 'select filter' procedure 517 allows the user to select a filter on the heterogeneous collection of entities so as to display a subset of the heterogeneous collection of entities. When the user uses a pointing device to activate the 'select filter' SCA 313, a list of available filters is presented to the user. The user selects one of the presented filters. The filter determines which entities from the heterogeneous collection of entities are to be displayed in the presentation area 301 of the dialog 300. The filter is invoked as is subsequently described with respect to FIG. 6.

The 'expand command' procedure 519 is invoked when the user activates the pointing device over an expand container icon (such as the 'expandable container' icon 317 of the dialog 300) associated with a container entity. This causes the entities contained in the associated container entity to be displayed as is described with respect to FIG. 6. In contrast, the 'reduce command' procedure 521 reverses the operation of the 'expand command' procedure 519 and causes the displayed entities contained in the associated container entity to be removed from the presentation area 301 of the dialog 300.

The 'select command' procedure 523 causes an entity selected by the pointing device to be returned to the program that invoked the dialog 300.

Figure 6:
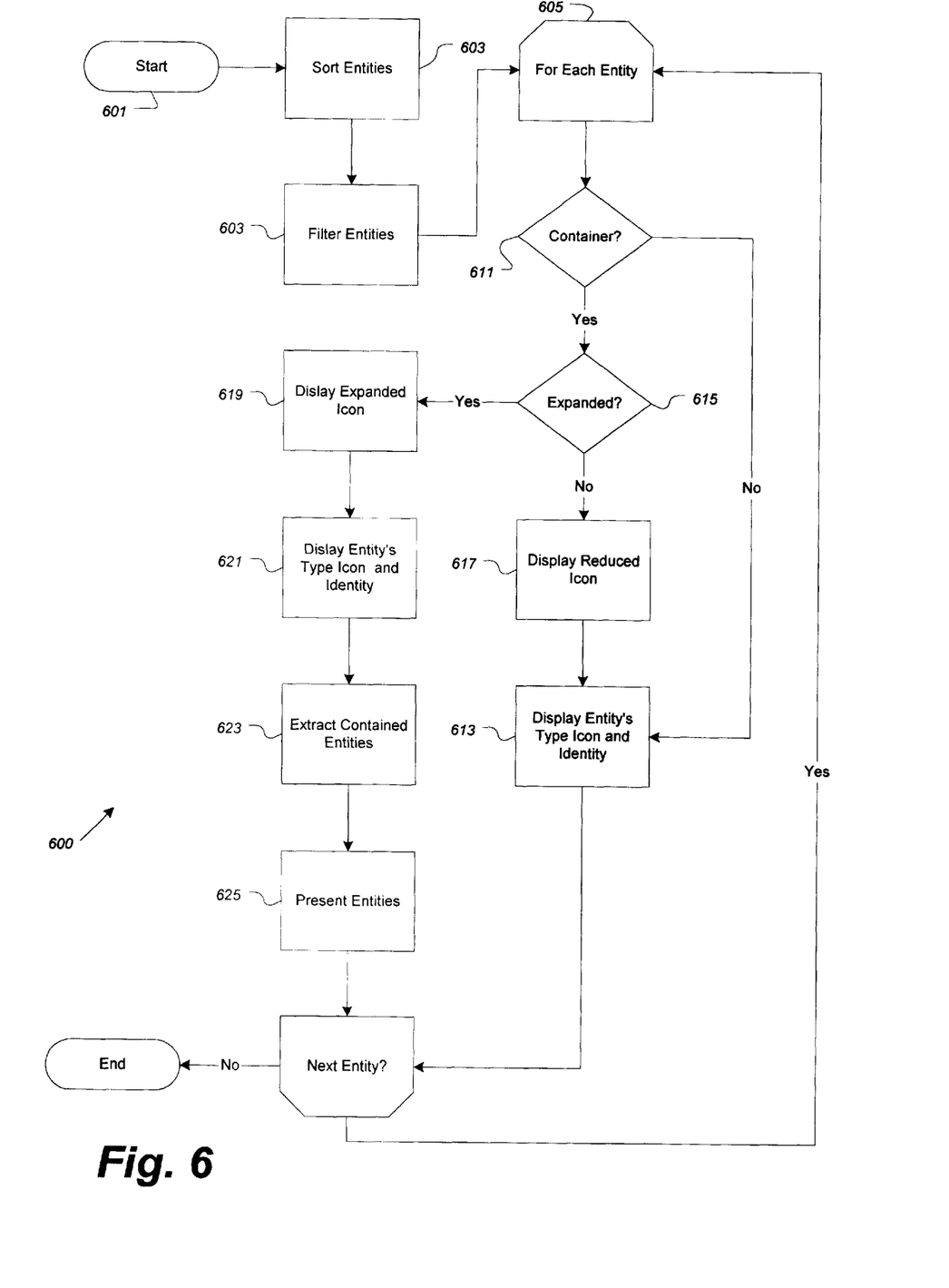
FIG. 6 illustrates an entity presentation process in accordance with a preferred embodiment.

FIG. 6 illustrates a 'present entities' process 600 used to present the accessed entities to the user. The 'present entities' process 600 initiates at a 'start' terminal 601 and continues to a 'sort entities' procedure 603. The 'sort entities' procedure 603 sorts the available entities as specified by the user. Then the 'present entities' process 600 continues to a 'filter entities' procedure 605 that removes entities from the heterogeneous collection of entities that will be displayed using the filter specified by the 'select filter' procedure 517. Next, the 'present entities' process 600 continues to an iterative procedure 607 that iterates over each entity in the filtered heterogeneous collection of entities. Once all the filtered heterogeneous collection of entities have been iterated, the 'present entities' process 600 completes through an 'end' terminal 609.

As each of the filtered heterogeneous collection of entities is iterated, the iterated entity is examined at a 'container entity' decision procedure 611 to determine whether the iterated entity is a container entity. If the iterated entity is not a container entity, the 'present entities' process 600 continues to a 'display entity's type icon and identity' procedure 613 that displays the entity's name and an icon that provides a visual representation of the entity's type. Next the 'present entities' process 600 returns to the iterative procedure 607 for the next iteration. However, if the 'container entity' decision procedure 611 determines that the entity was a container entity, the 'present entities' process 600 continues to an 'expanded entity' decision procedure 615. The 'expanded entity' decision procedure 615 determines whether the container entity has been expanded by the user (such as by the 'expand command' procedure 519 of FIG. 5). If the container entity has not been expanded, the 'present entities' process 600 continues to a 'display reduced icon' procedure 617 that displays the reduced container icon. Then the 'present entities' process 600 continues to the 'display entity's type icon and identity' procedure 613 that, as above, displays the entity's identification and type.

However, if the 'expanded entity' decision procedure 615 determines that the container entity has been expanded by the user, the 'present entities' process 600 continues to a 'display expanded icon' procedure 619 that presents a container expanded icon to the user. Next, the 'present entities' process 600 continues to a 'display entity's qpe icon and identity' procedure 621 that performs the same function as the 'display entity's type icon and identity' procedure 613 (previously described). Then the 'present entities' process 600 continues to an 'extract contained entities' procedure 623 that opens the container entity searches the entity to extract the contained entities, if any, from the container entity. This extraction includes reading the opened entity and parsing the contents of the opened entity to located the contained entities. It also includes invoking services related to the opened entity that return the contained entities (for example, accessing a directory file to obtain the files contained in the directory file). Once the contained entities have been extracted, the 'present entities' process 600 recursively calls the 'present entities' process 600 at a 'display entities' procedure 625. Once the contained entities have been presented, the 'present entities' process 600 continues to the iterative procedure 607 to iterate the next entity.

One skilled in the art will understand that the invention as previously described teaches a method, apparatus and programming product that provides a unified approach to presenting, expanding and selecting entities accessible to the computer through different access mechanisms.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for uniformly presenting a heterogeneous collection of entities to a user, said method comprising the steps of:

(a) locating a first entity, having a first identification, through a first access mechanism and a second entity, having a second identification, through a second access mechanism, said first access mechanism different from said second access mechanism, and said first entity and said second entity belonging to said heterogeneous collection of entities;

(b) determining a first container characteristic for said first entity; and (c) presenting said first identification, said second identification, and said first container characteristic to represent said heterogeneous collection of entities to provide thereby a uniform display of said heterogeneous collection of entities, said presenting of said first identification, said second identification being independent of said first and second access mechanisms.

2. The computer controlled method of claim 1, wherein said first container characteristic indicates that said first entity is expandable and the method further comprises:

(d) expanding said first entity.

3. The computer controlled method of claim 2 wherein step (d) comprises steps of:

(d1) opening said first entity;

(d2) searching said first entity for an entity reference that specifies a third entity having a third identification; and wherein step (c) also presents said third identification.

4. The computer controlled method of claim 3 wherein said first entity has an internal structure.

5. The computer controlled method of claim 4 wherein said internal structure defines a uniform resource locator (URL), a filename, a hyperlink, a system resource, a markup language tag, or a class identifier.

6. The computer controlled method of claim 1 wherein one of said first access mechanism and said second access mechanism is via a filesystem access mechanism and the other is via an internet access mechanism.

7. The computer controlled method of claim 1 further comprising selecting one of said first entity or said second entity by said user.

8. The computer controlled method of claim 1 wherein step (c) further comprises filtering said heterogeneous collection of entities.

9. An apparatus having a central processing unit (CPU) and a memory coupled to said CPU for uniformly presenting a heterogeneous collection of entities to a user, said apparatus comprising:
- an entity location mechanism configured to locate a first entity, having a first identification, through a first access mechanism and a second entity, having a second identification, through a second access mechanism, said first access mechanism different from said second access mechanism and said first entity and said second entity belonging to said heterogeneous collection of entities;
- a determination mechanism configured to determine a first container characteristic for said first entity located by the entity location mechanism; and
- a presentation mechanism configured to present said heterogeneous collection of entities representing said first identification, said second identification, and said first container characteristic to provide thereby a uniform display of said heterogeneous collection of entities, said presentation of said first identification, said second identification being independent of said first and second access mechanisms.

10. The apparatus of claim 9, wherein said first container characteristic indicates that said first entity is expandable and the apparatus further comprises:
- an expansion mechanism configured to expand said first entity.

11. The apparatus of claim 10 wherein the expansion mechanism comprises:
- an open entity mechanism configured to open said first entity;
- a search mechanism configured to search said first entity for an entity reference that specifies a third entity having a third identification; and
- wherein the presentation mechanism also presents said third identification.

12. The apparatus of claim 11 wherein said first entity has an internal structure.

13. The apparatus of claim 12 wherein said internal structure defines a uniform resource locator (URL), a filename, a hyperlink, a system resource, a markup language tag, or a class identifier.

14. The apparatus of claim 9 wherein the apparatus includes a network interface for accessing a network, and wherein access to one of said first access mechanism and said second access mechanism is via a filesystem access mechanism and access to the other is via an internet access mechanism.

15. The apparatus of claim 9 further comprising a selection mechanism configured to select one of said first entity or said second entity under control of said user.

16. The apparatus of claim 9 wherein the presentation mechanism further comprises a filter mechanism configured to filter said heterogeneous collection of entities.

17. A computer program product comprising:
- a computer usable storage medium having computer readable code embodied therein for uniformly presenting a heterogeneous collection of entities to a user, said computer readable code comprising:
- computer readable program code configured to cause said computer to effect an entity location mechanism configured to locate a first entity, having a first identification, through a first access mechanism and a second entity, having a second identification, though a second access mechanism, said first access mechanism different from said second access mechanism and said first entity and said second entity belonging to said heterogeneous collection of entities;
- computer readable program code configured to cause said computer to effect a determination mechanism configured to determine a first container characteristic for said first entity located by the entity location mechanism; and
- computer readable program code configured to cause said computer to effect a presentation mechanism configured to present said heterogeneous collection of entities representing said first identification, said second identification, and said first container characteristic to provide thereby a uniform display of said heterogeneous collection of entities, said presentation of said first identification, said second identification being independent of said first and second access mechanisms.

18. The computer program product of claim 17, wherein said first container characteristic indicates that said first entity is expandable and the product further comprises:
- computer readable program code configured to cause said computer to effect an expansion mechanism configured to expand said first entity.

19. The computer program product of claim 18 wherein the expansion mechanism comprises:
- computer readable program code configured to cause said computer to effect an open entity mechanism configured to open said first entity;
- computer readable program code configured to cause said computer to effect a search mechanism configured to search said first entity for an entity reference that specifies a third entity having a third identification; and
- wherein the presentation mechanism also presents said third identification.

20. The computer program product of claim 19 wherein said first entity has an internal structure.

21. The computer program product of claim 20 wherein said internal structure defines a uniform resource locator (URL), a filename, a hyperlink, a system resource, a markup language tag, or a class identifier.

22. The computer program product of claim 17 wherein the product includes a network interface for accessing a network and wherein access to one of said first access mechanism and said second access mechanism is via a filesystem access mechanism and access to the other is via an internet access mechanism.

23. The computer program product of claim 17 further comprising computer readable program code devices configured to cause said computer to effect a selection mechanism configured to select one of said first entity or said second entity under control of said user.

24. The computer program product of claim 17 wherein the presentation mechanism further comprises computer readable program code configured to cause said computer to effect a filter mechanism configured to filter said heterogeneous collection of entities.

* * * * *